(12) United States Patent
Lee et al.

(10) Patent No.: US 9,256,214 B2
(45) Date of Patent: Feb. 9, 2016

(54) NETWORK SYSTEM AND METHOD OF CONTROLLING NETWORK SYSTEM

(75) Inventors: Koonseok Lee, Seoul (KR); Daewoong Kim, Seoul (KR); Hoonbong Lee, Seoul (KR); Yanghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 931 days.

(21) Appl. No.: 13/511,584

(22) PCT Filed: Nov. 24, 2010

(86) PCT No.: PCT/KR2010/008313
§ 371 (c)(1),
(2), (4) Date: Jan. 22, 2013

(87) PCT Pub. No.: WO2011/065733
PCT Pub. Date: Jun. 3, 2011

(65) Prior Publication Data
US 2013/0131876 A1      May 23, 2013

(30) Foreign Application Priority Data

Nov. 24, 2009   (KR) .................. 10-2009-0114011
Nov. 24, 2009   (KR) .................. 10-2009-0114015

(51) Int. Cl.
| G05B 13/02 | (2006.01) |
| H04L 12/10 | (2006.01) |
| H02J 3/00 | (2006.01) |
| H02J 13/00 | (2006.01) |
| H02J 3/38 | (2006.01) |

(52) U.S. Cl.
CPC ............... *G05B 13/02* (2013.01); *H02J 3/008* (2013.01); *H02J 3/383* (2013.01); *H02J 3/386* (2013.01); *H02J 13/0062* (2013.01); *H02J 13/0075* (2013.01); *H04L 12/10* (2013.01); *H02J 3/382* (2013.01); *Y02E 10/563* (2013.01); *Y02E 10/763* (2013.01); *Y02E 40/72* (2013.01); *Y02E 40/76* (2013.01); *Y04S 10/123* (2013.01); *Y04S 10/545* (2013.01); *Y04S 50/10* (2013.01)

(58) Field of Classification Search
None
See application file for complete search history.

(56) References Cited

U.S. PATENT DOCUMENTS

| 6,598,029 B1 | 7/2003 | Johnson et al. |
| 6,885,914 B2 * | 4/2005 | Shimode et al. .............. 700/288 |
| 2004/0133529 A1 | 7/2004 | Munster |

(Continued)

FOREIGN PATENT DOCUMENTS

| JP | 2003299248 A | 10/2003 |
| WO | 0175756 A1 | 10/2001 |
| WO | 02065610 A2 | 8/2002 |

*Primary Examiner* — Sean Shechtman
*Assistant Examiner* — Steven Garland
(74) *Attorney, Agent, or Firm* — Dentons US LLP

(57) ABSTRACT

Provided are a network system and a method of controlling the same. The network system includes an energy supply part including a plurality of power supply sources, an energy metering part communicating with the plurality of power supply sources, the energy metering measuring energy supplied from the plurality of power supply sources, an energy management part receiving energy-related information supplied from the energy supply part, and an energy consumption part consuming power supplied from the energy supply part, the energy consumption part being operable and controllable by the energy management part. At least one power supply source of the plurality of power supply sources is selected according to an order of priority of a power supply, based on energy information related to the plurality of power supply sources. Thus, the power supply source having minimum costs is selected to efficiently manage energy within an intellectual power supply network.

14 Claims, 4 Drawing Sheets

(56) References Cited

U.S. PATENT DOCUMENTS

| | | |
|---|---|---|
| 2005/0034023 A1 | 2/2005 | Maturana et al. |
| 2007/0276547 A1 * | 11/2007 | Miller .......................... 700/295 |
| 2008/0040223 A1 | 2/2008 | Bridges et al. |
| 2009/0088907 A1 | 4/2009 | Lewis et al. |
| 2009/0088991 A1 | 4/2009 | Brzezowski et al. |
| 2009/0157835 A1 | 6/2009 | Thompson et al. |

* cited by examiner

NETWORK SYSTEM AND METHOD OF CONTROLLING NETWORK SYSTEM This application claims the benefit of priority of PCT Application No. PCT/KR2010/008313 filed on Nov. 24, 2010 which claims the benefit of priority of Korean Application No. 10-2009-0114011 filed on Nov. 24, 2009 and Korean Application No. 10-2009-0114015 filed on Nov. 24, 2009, all of which are incorporated by reference in their entirety herein.

TECHNICAL FIELD

The present disclosure relates to a network system and a method of controlling the network system.

BACKGROUND ART

A power system (power network) for supplying power into a home or office has a vertical and centralized network system that is concentrated into a center and controlled by a supplier. Also, in an electricity charge system, a charge system for use is a basic charge system, and charge systems for voltage and time are added to basic charge system. In addition, a progressive tax is applied to a house. Also, to disperse power consumption concentrated at a specific time, night-time electricity is now running. However, under the power system, it is difficult to realize a global target that is "Stop Global Warming" and solve limitations such as an absence of a plan for dealing with an increase of an energy raw material price, energy excessive consumption, and unstable supply of electricity.

Thus, it is needed to develop an intellectual power system in which two-way communication between a consumer and a supplier is established to improve efficiency of a power industry by doing away with the current power system. Furthermore, it is required to construct the intellectual power system so that consumers adjust their power consumption. Also, the development of intellectual devices mutually communicating with the intellectual power system is needed.

DISCLOSURE OF INVENTION

Technical Problem

Embodiments provide a method of further efficiently managing energy within an intellectual power supply network. Also, Embodiments also provide a method of selecting a power supply source having minimum costs of a plurality of power supply sources.

Embodiments also provide a method of selecting a power supply source having the highest energy efficiency of a plurality of power supply sources. Embodiments also provide an intellectual device, which is capable of selecting a power supply source having minimum costs.

Embodiments also provide a system for performing an efficient energy management method.

Solution to Problem

In one embodiment, a network system includes: an energy supply part including a plurality of power supply sources; an energy metering part communicating with the plurality of power supply sources, the energy metering measuring energy supplied from the plurality of power supply sources; an energy management part receiving energy-related information supplied from the energy supply part; and an energy consumption part consuming power supplied from the energy supply part, the energy consumption part being operable and controllable by the energy management part, wherein at least one power supply source of the plurality of power supply sources is selected according to an order of priority of a power supply, based on energy information related to the plurality of power supply sources.

In another embodiment, a network system includes: a power plant area network in which energy information within a power plant component communicates, the power plant area network including at least one power plant component, which supplies energy; and a power consumption area network in which energy information within a home or office communicates, the power consumption area network including a self-powered supply source in which energy is generated by itself, wherein the component constituting the power consumption area consumes energy supplied from the power plant component or the self-powered supply source, wherein at least one of the plurality of power supply sources including the power plant component and the self-powered supply source is selected as a usage power supply source based on a preset order of priority.

In further another embodiment, a method of controlling a network system including a plurality of power supply sources includes: recognizing an available power supply source of the plurality of power supply sources; when the available power supply source is provided in plurality, receiving energy information of each of the available power supply sources; and selecting at least one power supply source according to an order of priority, based on the energy information.

Advantageous Effects of Invention

According to the present disclosure, the power supply source having minimum costs may be selected to further efficiently manage the energy within the intellectual power supply network.

Also, the users may select the power supply source according to the real-time power information to minimize the costs and efficiently use the energy. In addition, the operation mode of the electric appliance may be selected to efficiently control the power consumption.

Also, the power consumption pattern during a certain period may be predicted and the power may be used based on the predicted information to efficiently manage the energy. In addition, the power consumption information may be continuously accumulated into the data storage to improve the accuracy of the predicted power consumption. Therefore, efficient power consumption may be possible.

In the network system according to the embodiments, since the power supply source having minimum costs may be selected to further efficiently manage the energy within the intellectual power supply network, industrial applicability is significantly high.

MODE FOR THE INVENTION

Figure 1:
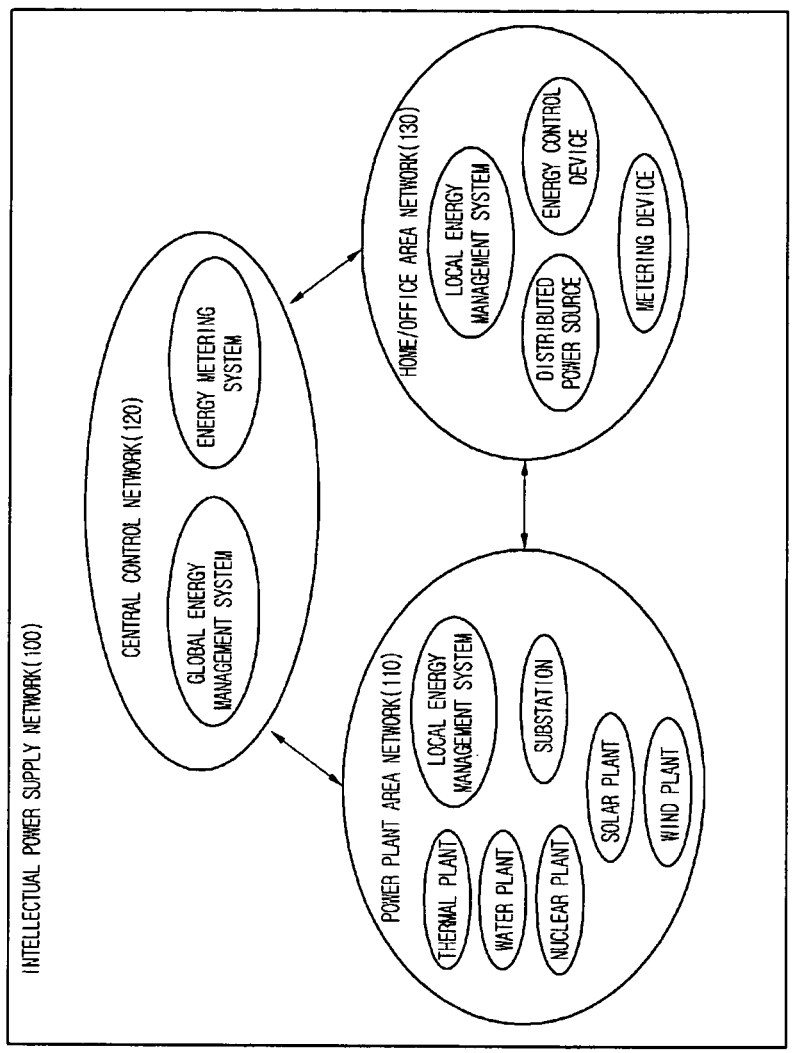
FIG. 1 is a schematic view of an intellectual power supply network according to an embodiment.

Reference will now be made in detail to the embodiments of the present disclosure, examples of which are illustrated in the accompanying drawings. The invention may, however, should not be construed as being limited to the embodiments set forth herein; rather, that alternate embodiments included in other retrogressive inventions or falling within the spirit and scope of the present disclosure will fully convey the concept of the invention to those skilled in the art.

All terms used herein have the same meanings as general terms understood by those of ordinary skill in the art. If the terms used herein collide with the general terms, the terms used herein take priority over the general terms. While the present disclosure has been particularly shown and described with reference to exemplary embodiments thereof, it will be understood by those of ordinary skill in the art that various changes in form and details may be made therein without departing from the spirit and scope of the present disclosure as defined by the following claims. Like reference numerals refer to like elements throughout.

FIG. 1 is a schematic view of an intellectual power supply network according to an embodiment.

Referring to FIG. 1, an intellectual power supply network 100 may include at least one local area network or at least one global area network. For example, the local area network may include a power plant area network 110 capable of sharing power information (energy information) between power plants, a home area network 130 capable of sharing power information between electric appliances within a house, an office area network 130 capable of sharing power information between electric appliances within an office, or a central control network 120 capable of controlling power information between local areas. The home area network 130 and the office area network 130 are called a "power consumption area network".

The global area network may represent a network including at least two or more local area networks. Also, the global area network may be understood as a relative concept corresponding to the local area network.

As one example of the intellectual power supply network 100 applied to the present disclosure, the intellectual power supply network 100 may include the power plant area network 110, the central control network 120, and at least one home/office area network 130.

The power plant area network 110 may include a power plant generating an electric power through thermal power generation, nuclear power generation, or water power generation and solar and wind power plants, which respectively use renewable solar energy and wind power. Here, a unit constituting the power plant area network 110 such as the thermal power plant and the nuclear power plant may be called a "power plant component".

An electric power generated in a thermal power plant, a nuclear power plant, or a water power plant is supplied into a substation through a power line, and the substation converts voltage or current properties to distribute the converted electric power into consumers within the home/office area network. Also, the electric power generated using the renewable energy is supplied into the substation, and then is distributed into each of the consumers.

The central control network 120 controls a power supply between the local area network within the intellectual power supply network 100, power consumption, and a power distribution and management. The central control network 120 includes a global energy management system and an energy analysis (metering) system.

The global energy management system controls the local energy management systems. For example, the global energy management system receives energy-related information from the local energy management system within the power plant area network 100 and the local energy management system within the home/office area network 130 to allow the intellectual power supply network 100 to entirely manage the energy.

The intellectual power supply network 100 may include an energy management system (EMS). The EMS represents a system for managing an energy control device using an energy management program. For example, the energy control device may include an automatic temperature control device, a cable set-top box, and an intellectual display device, and an automatic lighting control device. The energy management system may communicate with the energy control device to manage power of each residential consumer in real time. Also, the energy management system may predict power consumption in real time, based on accumulated data. The energy management system may be set for each residential consumer or supplier, and furthermore, may be set for each local area network or each global area network. Also, the energy management system may be provided as an energy management device. For example, a real-time price signal of an electricity market is broadcasted through a local energy management system installed in each home. Since the local energy management system communicates with each electric appliance to control the electric appliance, a user may recognize power information of each electric appliance through the local energy management system and perform a power management such as power amount limitation set-up or electricity charge limitation set-up, based on the power information, thereby saving energy and costs.

The intellectual power supply network may include an energy metering system. The energy metering system represents a system, which measures energy usage through metering devices to collect and analyze information with respect to use of energy. For example, the metering devices may include an electricity meters, gas meters, and water meters.

The energy management system and the energy metering system may allow the user to efficiently use electricity. Also, the energy management system and the energy metering system may detect errors with respect to a system to allow a power supplier to efficiently operate the system.

For example, when the real-time price signal of the electricity market is broadcasted through the energy management system installed in each home, since the energy management system communicates with each electric appliance to control the electric appliance, the user may recognize the power information of each electric appliance through the local energy management system and perform the power management such as the power amount limitation set-up or the electricity charge limitation set-up, based on the power information, thereby saving energy and costs.

In case of the home area network 130, residential customers may produce electricity by itself using a solar battery or fuel cell of a plug in hybrid electric vehicle (PHEV) for their consumption, and the remaining electricity may be supplied or sold into the other local area network. Also, an energy metering device may be provided in each of local area networks to check an electric power consumed for each of the consumers or electricity bills in real time, and thus a power supply unit within the local area networks may recognize the present power consumption amount and electricity charge to take action for reducing power consumption or electricity costs based on the real-time information about the power consumption and electricity charge. Also, two-way communication may be possible between the local area networks or units within the local area networks. In addition, the two-way communication may be possible between a unit within one local area network and a unit within the other local area network. Here, the unit may include a power plant, an electric company, a distributed power source, an energy management system, an energy metering system, an intellectual device, or an electric appliance. For example, the two-way communication may be possible between the power plant area network 110 and the home area network 130, and also between electric appliances within the home area network 130. Or, the two-way communication may be possible between the power plant within the power plant area network 110 and the energy management system within the home area network 130. Thus, the power consumption of each of the consumers may be monitored and managed to adequately product and distribute electricity.

Figure 2:
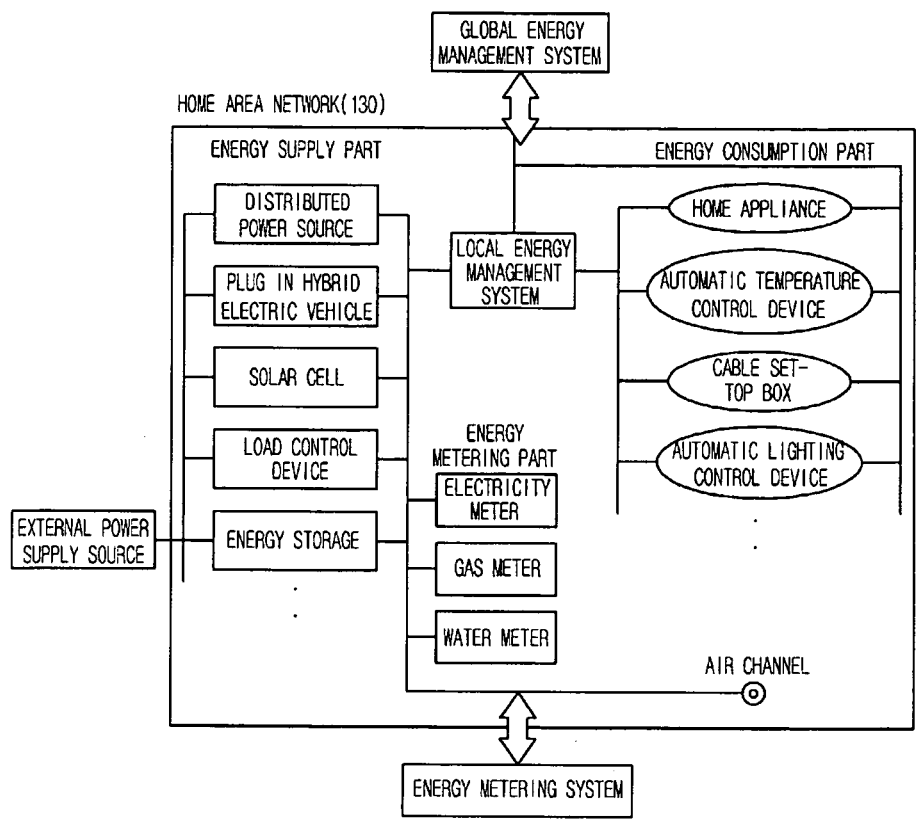
FIG. 2 is a schematic view illustrating a structure of a home area network according to an embodiment.

FIG. 2 is a schematic view illustrating a structure of a home area network according to an embodiment.

Referring to FIG. 2, a house area network 130 may correspond to one local area network within an intellectual power supply network. The home area network 130 may mutually communicate with the other local area network within the intellectual power supply network. Also, the home area network 130 may independently perform energy supply, consumption, storage, measurement, management, and communication. The home area network 130 may largely include an energy supply part, an energy consumption part, an energy metering part, and a local energy management system. Also, the home area network 130 may receive information for a general management of units therein through air channels. For example, the information receivable through the air channels may include a unit identifier, the present electricity charge information, relative level information of the present charge (e.g., high, middle, low), use information (e.g., residential, commercial), and error confirmation information (e.g., CRC information). A module for receiving broadcasting signals may include a digital multimedia broadcasting-terrestrial (DMB-T), a digital multimedia broadcasting-satellite (DMB-S), a media forward link only (mediaFLO), a digital video broadcast-handheld (DVB-H), and an integrated services digital broadcast-terrestrial (ISDB-T). The information obtained from the energy metering part may be transmitted into an external energy metering system, and the information obtained from the local energy management system may be transmitted into an external global energy management system or the other local energy management system.

The energy supply part may supply an electric power to the whole units within the home area network 130. The energy supply part may include a distributed power source, a plug in hybrid electric vehicle (PHEV), a solar cell, a load control device, and an energy storage. The distributed power source may represent the other power source except a power source supplied from the existing power plant, for example, a power source supplied from the other local area network or a self-powered supply source (plug in hybrid electric vehicle, solar cell). The distributed power source, the plug in hybrid electric vehicle, and the solar cell may produce and store electricity by oneself and provide the produced electricity to the other local area network. The load control device controls the devices by which the electricity is consumed within the home area network 130. The energy storage stores energy supplied from the external power supply source. Also, as necessary, the energy storage distributes the energy into the units within the home area network 130.

The energy consumption part consumes the energy supplied from the energy supply part, based on a command transmitted from the local energy management system. The energy consumption part may include a home appliance, an automatic temperature control device, a cable set-top box, and an automatic lighting control device.

The energy metering part is connected to the energy supply part or the energy consumption part to measure energy consumption and collect information with respect to the energy consumption, thereby analyzing the collected information. The energy metering part may include an electricity meter, a gas meter, and a water meter. The information obtained from the energy metering part may be transmitted into the energy metering system.

Figure 4:
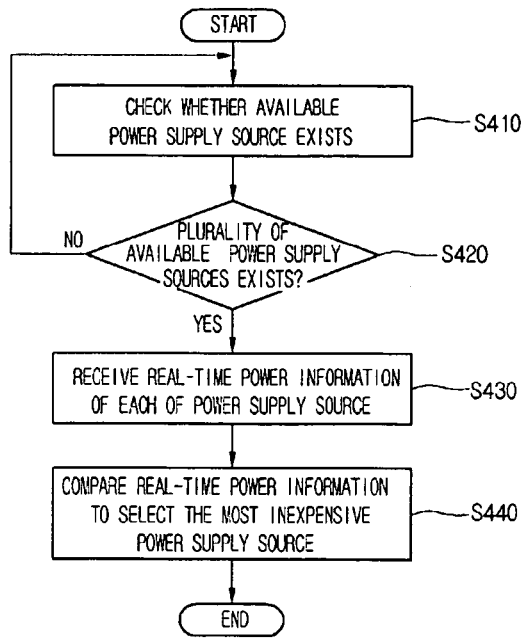
FIG. 4 is a flowchart illustrating a process of selecting a minimum charge power supply source from various power supply sources according to an embodiment.
Figure 5:
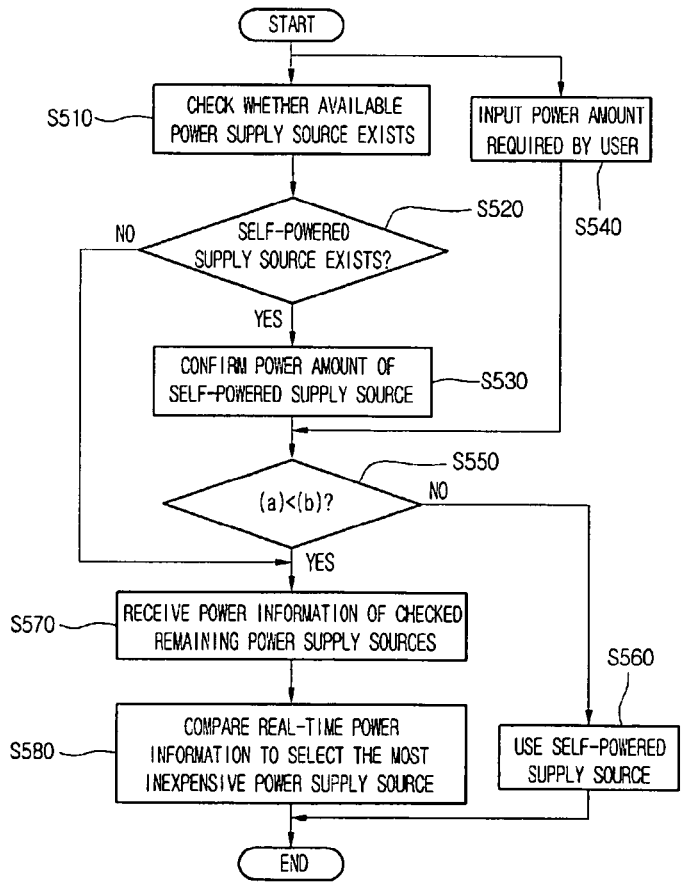
FIG. 5 is a flowchart illustrating a process of selecting a power supply source by applying an order of priority between a self-powered supply source and the other power supply source according to an embodiment.

The whole units within the home area network may mutually communicate with each other. Also, each of the units may include an intellectual device or an energy management program. Hereinafter, the intellectual device will be described in FIG. 3. In FIGS. 4 and 5, an energy management method, which is realized by the intellectual device, will be described in detail.

Figure 3:
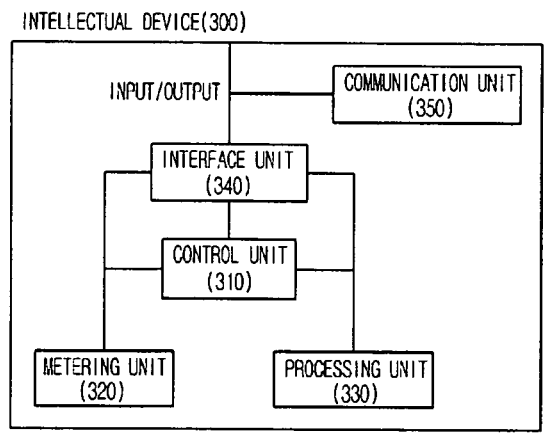
FIG. 3 is a block diagram of an intellectual device according to an embodiment.

FIG. 3 is a block diagram of an intellectual device according to an embodiment.

Referring to FIG. 3, an intellectual device 300 according to an embodiment is provided to at least one unit (component) constituting the intellectual power supply network.

The intellectual device includes a control unit 310, a metering unit 320, a processing unit 330, an interface unit 340, and a communication unit 350.

The control unit 310 controls the intellectual device through an inputted signal. For example, the control unit 310 may control an on/off operation of an electricity load or the on/off operation of the electricity load according to a set-up of a time interval. The control unit 310 may further accurately control the on/off operation of the electricity load within a preset critical value according to a set-up of the user. Also, the control unit 310 may limit an operation mode based on a critical value, a set value, or a price point. For example, when the price point reaches a predetermined price point during an operation of a standard mode, the control unit 310 may limit the standard mode to convert the standard mode into a power-saving mode. Also, the control unit 310 may output an optimal control command with respect to efficient power consumption, based on input information received from the interface unit 340.

The metering unit 320 measures and monitors power condition information of a corresponding device. The power condition information of the corresponding device represents information indicating power conditions of a unit constituting the intellectual power supply network. Here, the unit may include a power plant, an electric company, a distributed power source, an energy management system, an energy metering system, an intellectual device, or an electric appliance. For example, the power condition information may include instantaneous power consumption, accumulated power consumption, accumulated power generation, power consumption per period, power generation per period, or allowed power.

Also, the metering unit 320 may monitor current power conditions (e.g., power consumption per time or current power rate condition), current conditions of the corresponding device (e.g., operating, delaying, and repairing), operation mode conditions (e.g., charging, and using), power quality conditions (e.g., frequency, neutralizing voltage, and high-frequency conditions), environment conditions (e.g., intensities of temperature, moisture, movement, wind, and light), and environmental influence information (e.g., $CO_2$ emission amount). The power condition information measured by the metering unit 320 may be outputted to the control unit 310 or the processing unit 330 or transmitted to the other intellectual device through the communication unit 350.

The processing unit 330 calculates energy consumption information using the power condition information received from the metering unit 320. The energy consumption information represents all information required for managing users energy consumption. For example, the energy consumption information may include energy costs for accumulated power consumption, energy costs for instantaneous power consumption, power consumption costs per time, energy costs for rate tiers/energy blocks, energy costs for time-of-use energy rates, costs for critical peak pricing, costs for capacity billing rates, costs for demanded factors (e.g., tax, rental fee, and discount), power consumption costs for parameters defined by the user, power consumption costs for critical history, power productivity/consumption for critical history, or environmental influence information (e.g., carbon dioxide discharge amount, and carbon dioxide discharge prediction amount). The calculated energy consumption information may be displayed through the interface unit 340 or transmitted to the other intellectual device through the communication unit 350.

The interface unit 340 may transmit information inputted by the user into the control unit 310, the metering unit 320, or the processing unit 330, or display the information outputted from the control unit 310, the metering unit 320, and the processing unit 330. For example, the interface unit 340 may display indication information indicating operation states of the corresponding device and display re-set information for initially setting the corresponding device. The interface unit 340 may process invisible detection information (e.g., movement, vibration, sound) and display only information set by the user. Also, the interface unit 340 may provide alarm information (e.g., an alarm for informing limitation price information and an event message) and display detailed information of the corresponding device (e.g., kind of device, model name, basically set facts, and battery life).

The communication unit 350 communicates through a wire or wireless method. The communication unit 350 may transmit the information outputted from the control unit 310, the metering unit 320, and the processing unit 330 or transmit the information transmitted from the other intellectual device into the control unit 310, the metering unit 320, the processing unit 330, and the interface unit 340.

An internal structure of the intellectual device may be included in all units constituting the intellectual power supply network or may be included in a separate device and coupled to the units. Also, the intellectual device may be provided as one part of the energy management system described in FIG. 1, e.g., the energy management device. The intellectual device may be provided as a portable terminal form. The intellectual device transmits/receives a wireless signal into/from at least one of a base station on a mobile communication network, an external terminal, and a server. For example, the portable terminal may include smart phones, notebook computers, personal digital assistants (PDAs), portable multimedia players (PMPs), and navigations. A near-field communication technology may be applied to the portion terminal. Bluetooth, radio frequency identification (RFID), infrared data association (IrDA), ultra sideband (UWB), and ZigBee may be used as the near-field communication technology. Hereinafter, an energy management method, which is executed by the intellectual device will be described in detail.

FIG. 4 is a flowchart illustrating a process of selecting a minimum charge power supply source from various power supply sources according to an embodiment.

Electric appliances using electricity within the intellectual power supply network may receive power from a power supply source within a corresponding local network or the other local network. For example, an electric appliance within the home area network may receive central power supplied from the power plant area network in the existing method. However, since the intellectual power supply network has various distributed power sources, the electric appliance within the home area network may receive power from the other distributed power source except the central power. For example, the electric appliance may receive self-generated power from renewable fuel cells, solar cells, or fuel cells mounted on plug in hybrid electric vehicle. Alternatively, the electric appliance may receive power generated from the other local area network (e.g., the other home area network or office area network).

Since various power supply sources exists within the intellectual power supply network, the user may monitor real-time power information of each power supply source to select a power supply source adequate for oneself. Here, the power supply source may generate and supply power, as well as conserve power supplied from the other supplier to re-supply the power. For example, the power supply source may include a power plant, an electric company, an electricity vehicle, or a power storage device. The real-time power information may include suppliable power amount (energy amount) information, electricity charge (energy charge) information, power (energy) quality information, or suppliable time information. Thus, the user may compare and analyze the real-time power information of each power supply source to each other to select the most adequate power supply source, thereby realizing efficient power consumption.

In operation S401, it is checked whether an available power supply source exists. After checking the result, in operation S420, it is determined whether the available power supply source is provided in plurality. After confirming the result, when the available power supply source is not provided in plurality, it is checked again whether the other power supply source exists, until the other power supply source is checked. Here, when only one power supply source is checked, it may represent that the other power supply source does not exist or the other power supply source is non-available even though the other power supply source exists. For example, the non-available state may represent that the stored power is not enough for satisfying current power consumption. The non-available state may be decided by comparing a power amount detected when the existence of the power supply source is checked to a demanded power amount inputted by the user. Alternatively, the non-available state may be decided by confirming whether a power amount stored when the existence of the power supply source is checked exceeds a preset limitation storage rate (e.g., when the preset limitation storage rate is about 50%, the power supply source may be recognized as the available power supply source only when the power amount is above about 50%). For another example, when the other power supply source is not checked, but only one power supply source is checked, the one power supply source may be used.

When the plurality of power supply sources exist, real-time power information of each of the plurality of power supply sources may be received in operation S430. In operation S440, the real-time power information may be compared to each other to select the most inexpensive power supply source. For example, real-time electricity charge information of each power supply source may be compared to each other to select a power supply source supplying the most inexpensive power. An example of the power information and an example of the most inexpensive power supply source will be described in detail with reference to FIG. 5.

FIG. 5 is a flowchart illustrating a process of selecting a power supply source by applying an order of priority between a self-powered supply source and the other power supply source according to an embodiment.

Referring to FIG. 5, in operation S510, it is checked whether an available power supply source exists. When a self-powered supply source of the checked power supply sources exists in operation S520, a power amount (a) suppliable from the self-powered supply source is checked in operation S530. Comparing the power amount (a) suppliable from the self-powered supply source to a power amount (b) required by a user, when the power amount (a) suppliable from the self-powered supply source is greater than the power amount (b) required by the user, the self-powered supply source may be available in operation S560. Here, when the self-powered supply source is provided in plurality, the plurality of self-powered supply sources may be used in order, based on power information of the self-powered supply sources. For example, an order of priority of a sale price of the self power, a power generation per time, a power generation per day, or a suppliable power amount is set to use them based on the set order of priority. Alternatively, the used order may be decided in consideration of two or more power information of the power information. For example, the self power that has the most inexpensive seal price may be preferentially used, or the self power in which the power generation per time is highest may be preferentially used.

On the other hand, when the power amount (a) suppliable from the self-powered supply source is less than the power amount (b) required by the user in operation S550, power information of the remaining power supply sources except the self-powered supply source of the checked power supply sources may be received in operation S570. Here, the remaining power supply sources may be power supply sources within the other local area network, for example, the power plant area network, the home area network, or the office area network. The power information may include suppliable power amount information, electricity charge information, power quality information, or suppliable time information. In operation S580, a power supply source having a minimum electricity charge may be selected by comparing power information of the remaining power supply sources to each other. Here, an order of priority may be set in the process for comparing the power information. For example, the electricity charge information may be set to an order of the highest priority. Here, the electricity charge information may include various electricity charge information. For example, the various electricity charge information may include an electricity charge per time, an electricity per certain period, a current electricity charge, and an electricity charge for each quality degree. The most inexpensive power supply source may be selected by comparing the charge information.

According to another embodiment applied to the present disclosure, unlike the above-described embodiment, the self-powered supply source may be used after the other power supply sources are used without deciding whether the self-powered supply source is used. For example, when production costs of power generated from the self-powered supply source is less than that of the other power supply source, the other power supply source may be preferentially used, and then, the self-powered supply source may be used. Since this process is similar to that of the above-described embodiment, its detailed description will be omitted.

Also, the above-described method of controlling the power, which is applied to the present disclosure, may be programmed as a program that is executed in a computer, and then may be stored in a computer-readable recording medium. Also, data having a data structure according to the present disclosure may be stored in the computer-readable recording medium. The computer-readable recording medium includes various storage devices in which computer-readable data is stored. Examples of the computer-readable recording medium include a ROM, a RAM, a CD-ROM, a magnetic tape, a floppy disk, and an optical storage device. In addition, the computer-readable recording medium may include a wavelength realized in a carrier wave form (e.g., transmission through an internet). Also, a bit stream generated by the energy management method applied to the present disclosure may be stored in the computer-readable recording medium or transmitted through wire/wireless communication network.

Hereinafter, a second embodiment will be described. The present embodiment is different from the above-described embodiment in that orders of priority of a main supply source of a plurality of power supply sources and a post-order power supply source are given. Thus, their different points will be mainly described, and the same portions will be denoted by the same description and reference numeral as those of the previous embodiment.

Figure 6:
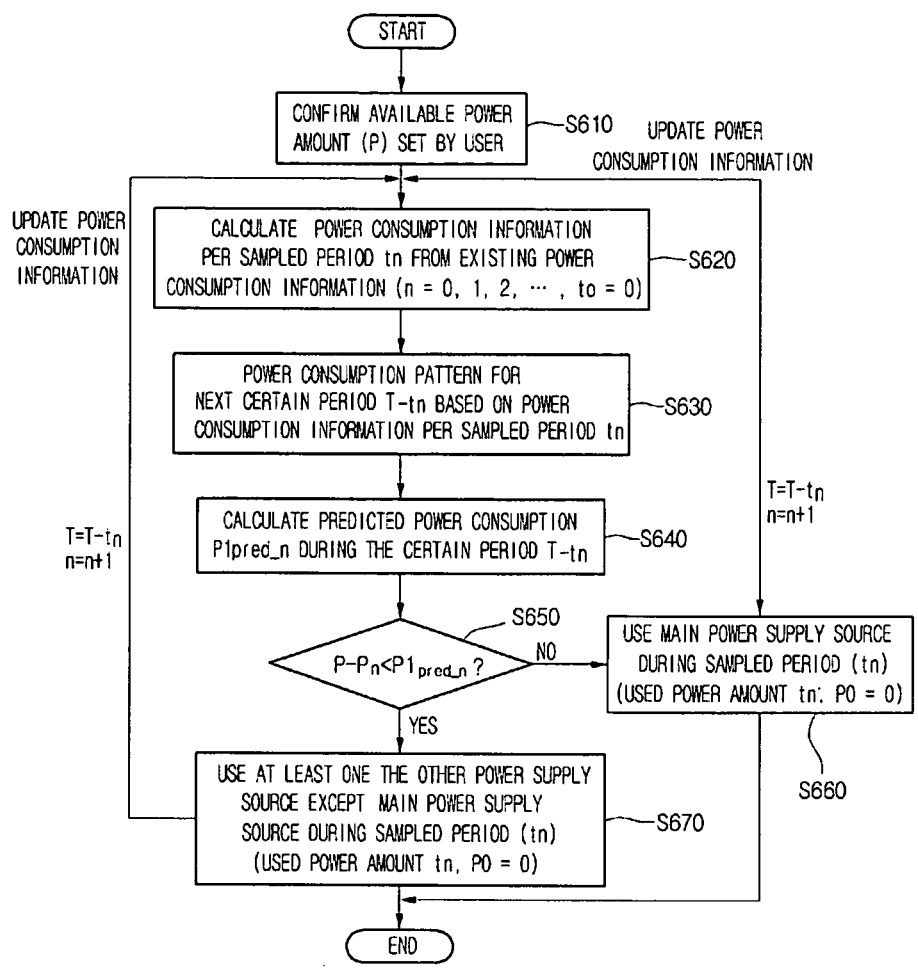
FIG. 6 is a flowchart illustrating a process of comparing power consumption information to select a power supply source according to another embodiment.

FIG. 6 is a flowchart illustrating a process of comparing power consumption information to select a power supply source according to another embodiment.

Electric appliances used within an intellectual power supply network may be efficiently operated in power consumption in consideration of external and internal environments. For this, the electric appliances should be operated based on various operation modes. For example, the various operation modes may include a standard mode, a power-saving mode, and a charge-saving mode. The charge-saving mode may include a real-time minimum charge mode and a minimum charge mode per period according to an applied reference.

The operation modes may be separately set according to an independent characteristic of each electric appliance. Alternatively, the operation modes may be set by a group having a common characteristic or by a local area network. For example, since short-term usage products such as air conditioner, a washing machine, an oven, and a dryer and long-term usage products such as a refrigerator, a computer, and a lighting device have a large difference in usage time, their operation mode may be different from each other. In case of the refrigerator, the refrigerator may be set to the standard mode because stable power should be supplied for a long time. In case of the washing machine, the washing machine may be set to a charge-saving mode because power is temporarily supplied. Here, the standard mode may be used by setting power supplied from a power plant area network as a main power supply source.

According to an embodiment, the real-time minimum charge mode represents a mode in which real-time charge information of each power supply source is compared to select a power supply source having a minimum charge when at least two or more power supply sources exist, and power supplied the power supply source having the minimum charge is used. For example, current charge information of each power supply source may be compared to select a power supply source supplying power having the most inexpensive charge.

According to another embodiment, the minimum charge mode per period represents a mode in which a power consumption pattern for a predetermined period is predicted based on existing power consumption information, and a minimum charge per period is calculated according to the predicted power consumption pattern.

First, in operation S610, a power amount P usable for a next predetermined period T or a power amount P corresponding to a certain charge may be set by a user. For example, when it is assumed that one main power supply source exists, a power amount used for one month may be set to a certain power amount (1,000 kw), or a certain charge may be set to be usable within a certain charge (fifty thousand wons) for one month. Here, in operation S620, power consumption information per sampled period $t_n$ may be calculated from the existing power consumption information stored in a data storage. Here, it may be set such that n=0, 1, 2, . . . , $t_o$=0. Also, in operation S630, a power consumption pattern may be predicted for a next certain period T–$t_n$ based on the power consumption information per sampled period $t_n$. In operation S640, predicted power consumption $P1_{pred\_n}$ during the certain period T–$t_n$ may be calculated from the power consumption pattern during the predicted certain period T–$t_n$. In operation S650, comparing a power amount P–$P_n$ set by the user to the predicted power consumption $P1_{pred\_n}$, when the power amount P–$P_n$ set by the user is greater than the predicted power consumption $P1_{pred\_n}$, only a main power supply source may be used without using the other distributed power source in operation S660. Here, the reference symbol $P_n$ represents a power amount used for the sampled period $t_n$, and it may be set such that $P_0$=0. On the other hand, when the power amount P–$P_n$ set by the user is less than the predicted power consumption $P1_{pred\_n}$, at least one other power supply source (post-order power supply source) may be used in operation S670. Here, the main power supply source and the post-order power supply source may be used in preset rate or order.

As described above, information with respect to the main power supply source and the post-order power supply source may be common to each other and previously set. That is, a fact in which at least one power supply source is selected according to an order of priority, based on the information with respect to the plurality of power supply sources will be understood equal to that of the foregoing embodiment.

Also, after the main power supply source (or the other power supply source) is used for the sampled period $t_n$, the power consumption information P1 during the sampled period $t_n$ is transmitted to the data storage to update of the existing power consumption information. Power consumption information per sampled period $t_{n+1}$ may be calculated again based on the updated power consumption information. A power consumption pattern during the next remaining period T–$t_{n+1}$ may be predicted based on the recalculated power consumption information per sampled period $t_{n+1}$. Predicted power consumption $P1_{pred\_n+1}$ during the remaining period T–$t_{n+1}$ may be calculated again from the power consumption pattern during the predicted remaining period T–$t_{n+1}$. Here, T is updated to T–$T_n$. Similarly, it is determined whether what power supply source is used by comparing a remaining power amount P–$P_{n+1}$ after the sampled period $t_n$ to the predicted power consumption $P1_{pred\_n+1}$ during the remaining period T–$t_{n+1}$. The above-described process may be repeatedly performed to accumulate the power consumption information in the data storage. Thus, the accuracy of the predicted power consumption may be improved and the power may be efficiently consumed.

The present embodiment is equal to the previously described embodiment in that an available power supply source is provided in plurality and an order of priority (main power supply source and a post-order power supply) of the plurality of power supply sources is set. Thus, their duplicated descriptions will be denoted by the same description as those of the previous embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the network system of the present disclosure, since the power management program is executed using the environment information management unit, the energy may be further efficiently managed within the intellectual power supply network. Therefore, industrial applicability is significantly high.

The invention claimed is:

1. A network system comprising:
an energy supply part comprising a plurality of power supply sources;
an energy metering part communicating with the plurality of power supply sources, the energy metering part measuring energy supplied from the plurality of power supply sources;
an energy management part receiving energy-related information supplied from the energy supply part;
an energy consumption part consuming power supplied from the energy supply part, the energy consumption part being operable and controllable by the energy management part;
a storage provided at the energy management part or the energy consumption part to store power consumption information for the energy consumption part,
wherein the plurality of power supply sources comprises a main power supply source; and a post-order power supply source having a lower order of priority than the main power supply source,
wherein while a threshold for power consumption amount or charge during a set period is recognized, the energy management part or the energy consumption part is configured to:
sample a power consumption amount stored in the storage, and
determine a predicted power consumption or charge during the set period, using the sampled power consumption amount,
wherein when the threshold is equal to or greater than the determined predicted power consumption or the charge, the main power supply source is used without the post-order power supply source, and wherein when the threshold is less than the determined predicted power consumption or the charge, the main power supply source and the post-order power supply source are used.

2. The network system according to claim 1, wherein the energy-related information comprises at least one of suppliable power amount information, energy charge information, energy quality information, and suppliable time information.

3. The network system according to claim 1, wherein the plurality of power supply sources further comprises a power source supplied from a power plant or a self-powered supply source.

4. The network system according to claim 3, wherein the power source supplied from the power plant comprises at least one of a thermal power plant, a nuclear power plant, a solar power plant, and a wind power plant.

5. The network system according to claim 4, wherein a power supply source of the power plant is provided in plurality, and
a power supply source having the most inexpensive charge is selected as the usage power supply source.

6. The network system according to claim 3, wherein the self-powered supply source comprises at least one of a distributed power source, an electric vehicle, and a solar cell.

7. The network system according to claim 3, wherein the self-powered supply source is constituted by the plurality of power supply sources in which an order of priority is set.

8. The network system according to claim 7, wherein the order of priority of the self-powered supply source is decided based on power information comprising a sale price of the self power, a power generation per time, a power generation per day, or a suppliable power amount.

9. The network system according to claim 3, wherein, when power from the self-powered supply source is greater than a required power amount, the self-powered supply source is selected as the usage power supply source.

10. The network system according to claim 1, wherein the predicted power consumption is calculated by predicting a future power consumption pattern, based on power consumption information per sampled period.

11. A method of controlling a network system comprising a plurality of power supply sources, the method comprising:
recognizing an available power supply source of the plurality of power supply sources;
receiving energy information of available power supply sources comprising a plurality of power supply sources; and
selecting at least one power supply source according to an order of priority, based on the energy information,
the method further comprising:
recognizing a threshold for power consumption amount or charge during a set period;
storing in a storage power consumption information for an energy consumption part;
sampling a power consumption amount stored in the storage; and
determine a predicted power consumption or charge during the set period, using the sampled power consumption amount,
wherein the plurality of available power supply sources comprise a main power supply source; and a post-order power supply source having a lower order of priority than the main power supply source,
wherein when the threshold is equal to or greater than the determined predicted power consumption or the charge, the main power supply source is used without the post-order power supply source, and
wherein when the threshold is less than the determined predicted power consumption or the charge, the main power supply source and the post-order power supply source are used.

12. The method according to claim 11, wherein the plurality of available power supply sources further comprises a self-powered supply source and a power plant supply source,
wherein the self-powered supply source or the power plant supply source is selectively used based on a comparison result between a power amount of the self-powered supply source and a required power amount.

13. The method according to claim 12, wherein, when the power amount of the self-powered supply source is greater than the required power amount, the self-powered supply source is used.

14. The method according to claim 12, wherein, when the power amount of the self-powered supply source is less than the required power amount, the power plant supply source is used.

* * * * *